US011405883B2

(12) United States Patent
Choi et al.

(10) Patent No.: US 11,405,883 B2
(45) Date of Patent: Aug. 2, 2022

(54) POSITIONING ENHANCEMENTS FOR NARROWBAND INTERNET OF THINGS

(71) Applicant: Apple Inc., Cupertino, CA (US)

(72) Inventors: Hyung-Nam Choi, Hamburg (DE); Chandru Aswani, Bangalore (IN); Karim E. Morsy, Nuremberg (DE); Marta Martinez Tarradell, Hilsboro, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/008,056

(22) Filed: Aug. 31, 2020

(65) Prior Publication Data

US 2021/0058888 A1 Feb. 25, 2021

Related U.S. Application Data

(63) Continuation of application No. 16/474,149, filed as application No. PCT/US2018/016441 on Feb. 1, 2018, now Pat. No. 10,772,064.

(Continued)

(51) Int. Cl.
*H04W 76/27* (2018.01)
*H04W 64/00* (2009.01)
(Continued)

(52) U.S. Cl.
CPC .......... *H04W 64/00* (2013.01); *G01S 5/0236* (2013.01); *G01S 5/06* (2013.01); *H04W 76/27* (2018.02); *H04W 84/042* (2013.01)

(58) Field of Classification Search
CPC ... H04W 64/00; H04W 76/27; H04W 84/042; H04W 4/02; H04W 4/00; G01S 5/0236;
(Continued)

(56) References Cited

U.S. PATENT DOCUMENTS

2012/0314604 A1 12/2012 Siomina et al.
2013/0273905 A1 10/2013 Krishnamurthy et al.
(Continued)

OTHER PUBLICATIONS

"International Application Serial No. PCT/US2018/016441, International Search Report dated Jun. 4, 2018", 3 pgs.

(Continued)

*Primary Examiner* — Chuong A Ngo
(74) *Attorney, Agent, or Firm* — Kowert, Hood, Munyon, Rankin & Goetzel, P.C.

(57) ABSTRACT

System and methods of providing location techniques for a NB UE are described. The UE transmits, to a location server, a capability message that indicates position capabilities of the UE to support different positioning methods and common information related to the position methods, including that the UE is a NB UE. The UE receives a request for location information that includes a request for positioning measurement for a particular positioning method, a NB message size limit that indicates a limit on an amount of location information to return, and a NB response time to provide the positioning measurements. At least one of the response time or message size limit is different than for the NB UE than for non-NB UEs. The UE enters an idle state, performs the measurements, and transmits at expiry of or before the NB response time, a message containing the measurements.

20 Claims, 9 Drawing Sheets

Related U.S. Application Data

(60) Provisional application No. 62/453,968, filed on Feb. 2, 2017.

(51) Int. Cl.
*G01S 5/02* (2010.01)
*G01S 5/06* (2006.01)
*H04W 84/04* (2009.01)

(58) Field of Classification Search
CPC ......... G01S 5/06; G01S 5/02; Y02D 70/1262; Y02D 70/164; Y02D 70/24; Y02D 70/166; Y02D 70/1242; Y02D 70/1224; Y02D 70/142; Y02D 70/144; Y02D 70/1264; Y02D 70/23; Y02D 70/21; Y02D 70/00; Y02D 70/126; Y02D 70/10; Y02D 70/12
See application file for complete search history.

(56) References Cited

U.S. PATENT DOCUMENTS

| | | |
|---|---|---|
| 2014/0128115 A1* | 5/2014 | Siomina ............ H04W 24/10 455/501 |
| 2014/0228057 A1 | 8/2014 | Uga et al. |
| 2015/0094091 A1 | 4/2015 | Stern-Berkowitz et al. |
| 2016/0157053 A1 | 6/2016 | Zhang et al. |
| 2017/0331670 A1 | 11/2017 | Parkvall et al. |
| 2018/0343635 A1 | 11/2018 | Edge et al. |
| 2019/0215121 A1* | 7/2019 | Lin ..................... H01M 4/13 |

OTHER PUBLICATIONS

"International Application Serial No. PCT/US2018/016441, Written Opinion dated Jun. 4, 2018", 7 pgs.

"Introduction to OTDOA on LTE networks", Qualcomm Technologies, Inc. (Aug. 7, 2014), 1-18.

* cited by examiner

POSITIONING ENHANCEMENTS FOR NARROWBAND INTERNET OF THINGS

PRIORITY CLAIM

This application is continuation of U.S. application Ser. No. 16/474,149, entitled "POSITIONING ENHANCEMENTS FOR NARROWBAND INTERNET OF THINGS" and filed Jun. 27, 2019, which is a U.S. National Stage Filing under 35 U.S.C. 371 from International Application No. PCT/US2018/016441, filed Feb. 1, 2018 and published in English as WO 2018/144722 on Aug. 9, 2018, which claims the benefit of priority to U.S. provisional patent application Ser. No. 62/453,968, filed Feb. 2, 2017, entitled "POSITIONING ENHANCEMENTS FOR NARROWBAND INTERNET OF THINGS", each of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks (RANs). Some embodiments relate to narrowband (NB) Internet of Things (IoT) communications in cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to location determination of NB user equipment (UEs).

BACKGROUND

The use of 3GPP LTE systems (including LTE and LTE-A systems) has increased due to both an increase in the types of devices user equipment (UEs) using network resources as well as the amount of data and bandwidth being used by various applications, such as video streaming, operating on these UEs. In particular, both typical UEs such as cell phones and Narrowband Internet of Things (NB-IoT) UEs currently use 3GPP LTE systems. The latter such UEs, which may include machine-type communications (MTC) UEs pose particular challenges as such UEs are typically low cost devices that have low power consumption, and thus have smaller batteries and smaller communication ranges. Examples of such UEs include sensors (e.g., sensing environmental conditions) or microcontrollers in appliances or vending machines. The number of NB-IoT UEs in use is expected to be massive, thus leading to further development as networks attempt to accommodate for the disparate requirements of the different types of UEs. Work is ongoing to introduce enhancements of NB-IoT to achieve even lower power consumption, to make more efficient use of the NB-IoT resources, and to extend NB-IoT with new functionalities.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
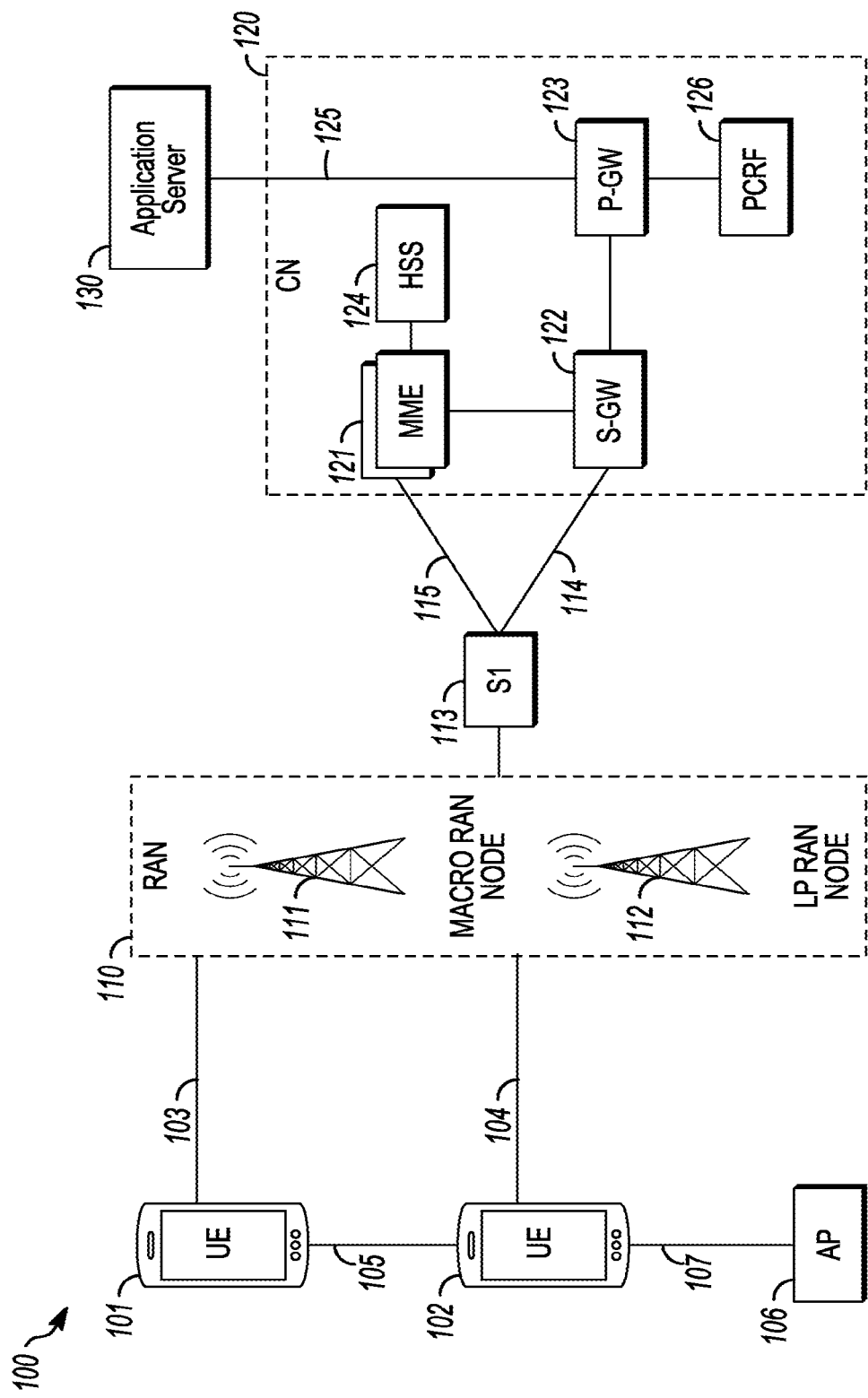
FIG. 1 illustrates an architecture of a system of a network in accordance with some embodiments.

FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110— the RAN 110 may be, for example, an Evolved Universal Mobile Telecommunications System (UMTS)

Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gigabit NodeBs—gNBs), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 or NG interface 113. In embodiments, the CN 120 may be an evolved packet core (EPC) network, a 5GC network, or some other type of CN. In this embodiment, the S1 interface 113 is split into two parts: the S1-U interface 114, which carries traffic data between the RAN nodes 111 and 112 and the serving gateway (S-GW) 122, and the S-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
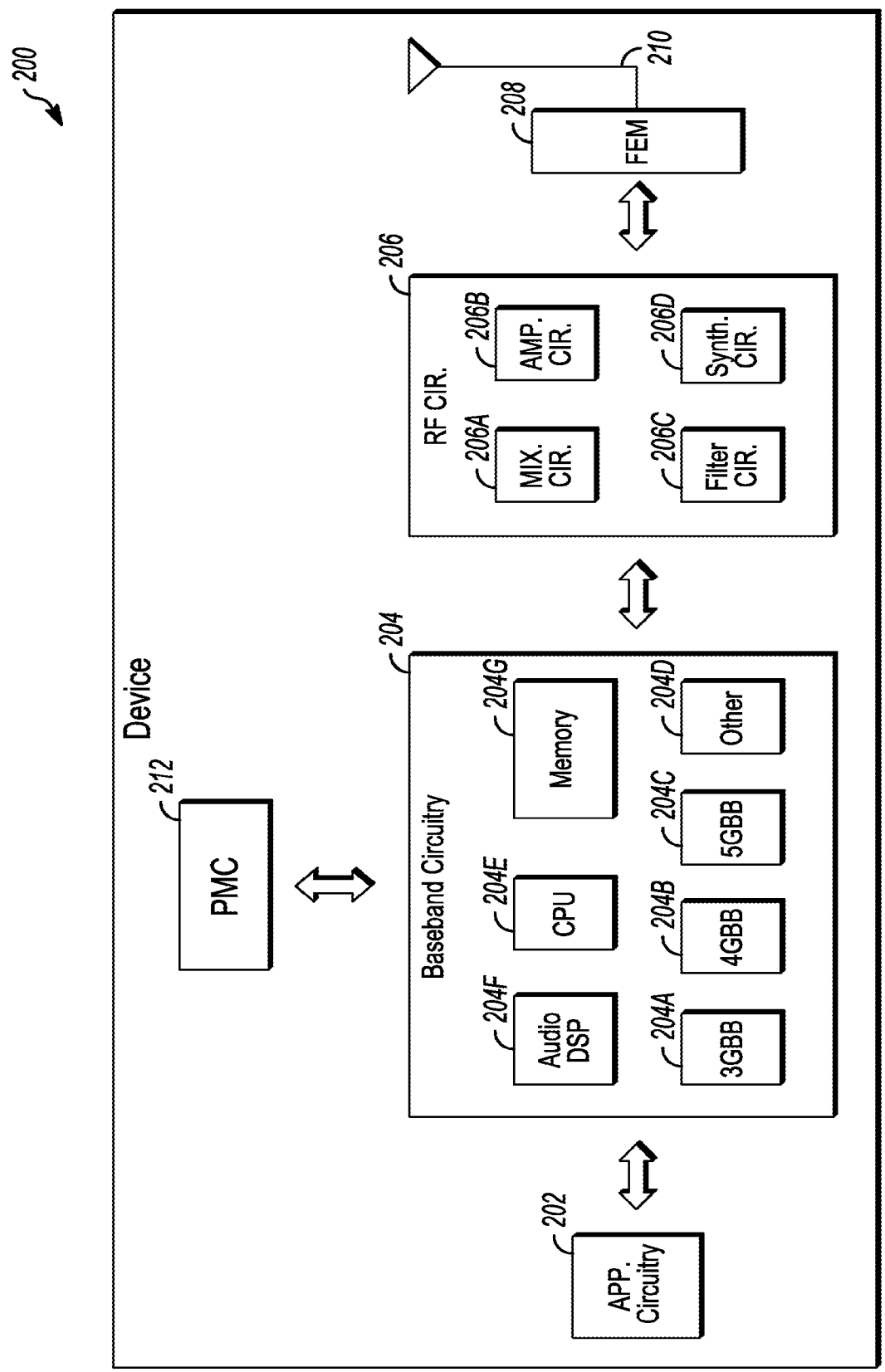
FIG. 2 illustrates example components of a device in accordance with some embodiments.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a 5G baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tail-biting convolution, turbo, Viterbi, or Low Density Parity Check (LDPC)

encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206A, amplifier circuitry 206B and filter circuitry 206C. In some embodiments, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some embodiments, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206A of the receive signal path may comprise passive mixers, although the scope of the embodiments is not limited in this respect.

In some embodiments, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some embodiments, the mixer circuitry 206A of the receive signal path and the mixer circuitry 206A of the transmit signal path may include two or more mixers and may be arranged for quadrature downconversion and upconversion, respectively. In some embodiments, the mixer circuitry 206A of the receive signal path and the mixer circuitry 206A of the transmit signal path may include two or more mixers and may be arranged for image rejection (e.g., Hartley image rejection). In some embodiments, the mixer circuitry 206A of the receive signal path and the mixer circuitry 206A may be arranged for direct downconversion and direct upconversion, respectively. In some embodiments, the mixer circuitry 206A of the receive signal path and the mixer circuitry 206A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206D may be a fractional-N synthesizer or a fractional N/N+1 synthesizer, although the scope of the embodiments is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some embodiments, the synthesizer circuitry 206D may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition to an RRC_Idle state. In the RRC_Idle state, the device 200 may disconnect from the network and avoid performing operations such as channel quality feedback, handover, etc. The device 200 may enter a very low power state and perform paging in which the device 200 may periodically wake up to listen to the network and then power down again. To receive data, the device 200 may transition back to the RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
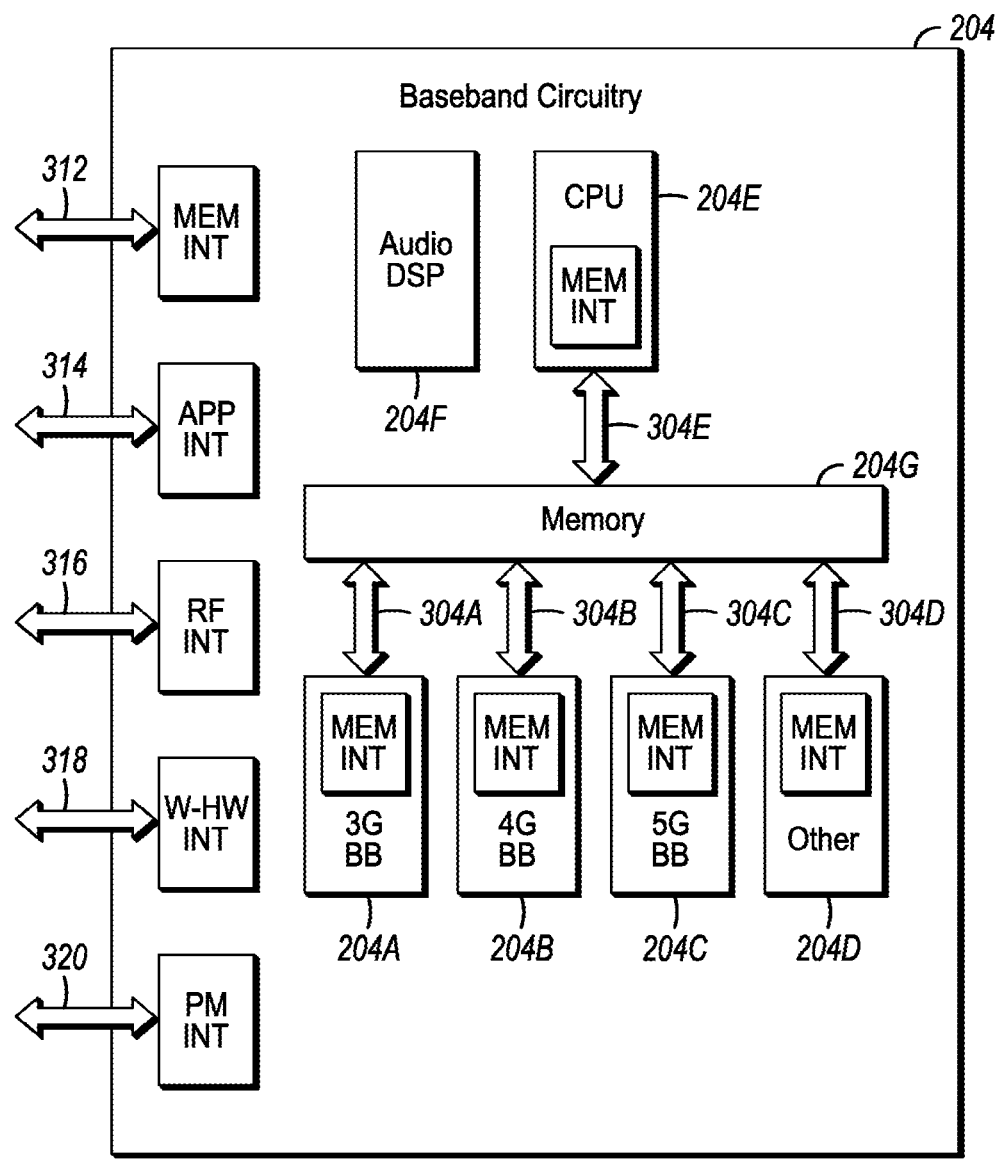
FIG. 3 illustrates example interfaces of baseband circuitry in accordance with some embodiments.

FIG. 3 illustrates example interfaces of baseband circuitry in accordance with some embodiments. As discussed above, the baseband circuitry 204 of FIG. 2 may comprise processors 204A-XT04E and a memory 204G utilized by said processors. Each of the processors 204A-XT04E may include a memory interface, 304A-XU04E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
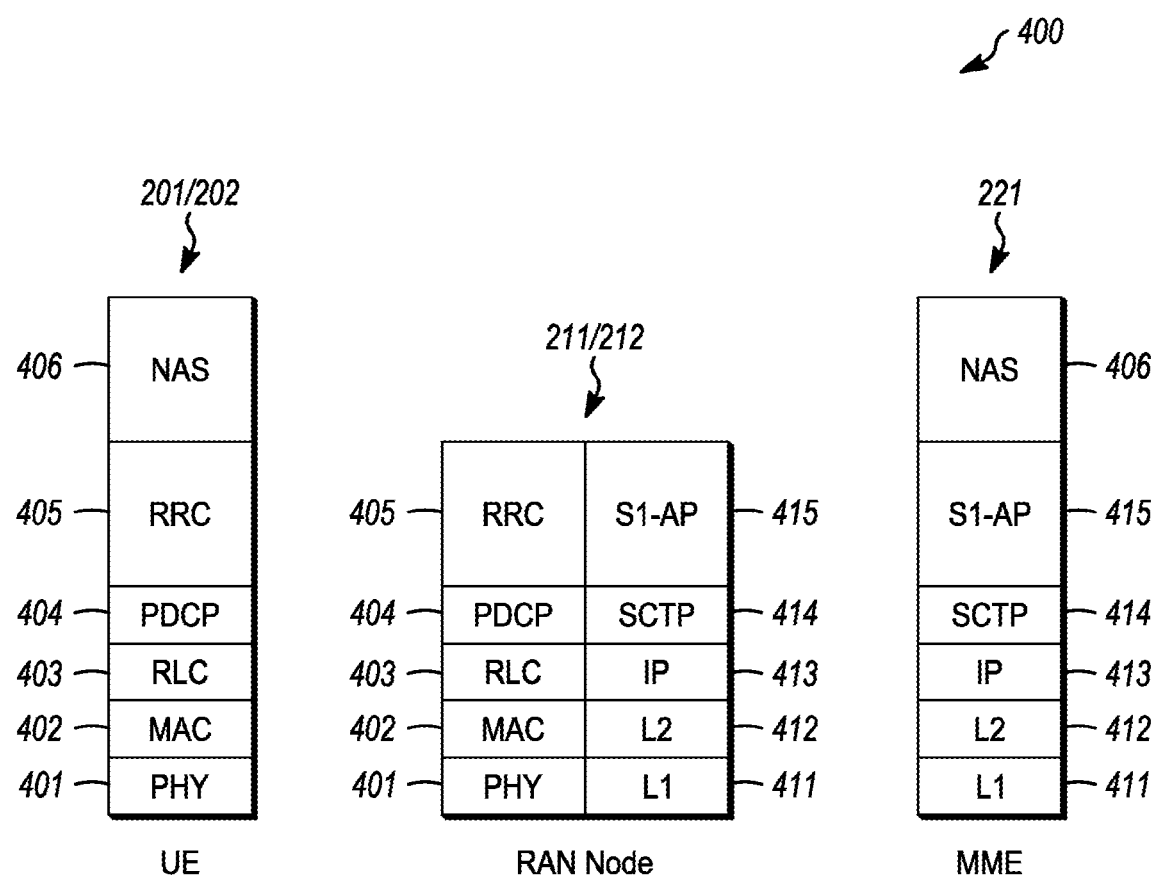
FIG. 4 is an illustration of a control plane protocol stack in accordance with some embodiments.

FIG. 4 is an illustration of a control plane protocol stack in accordance with some embodiments. In this embodiment, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S-AP layer 415.

Figure 5:
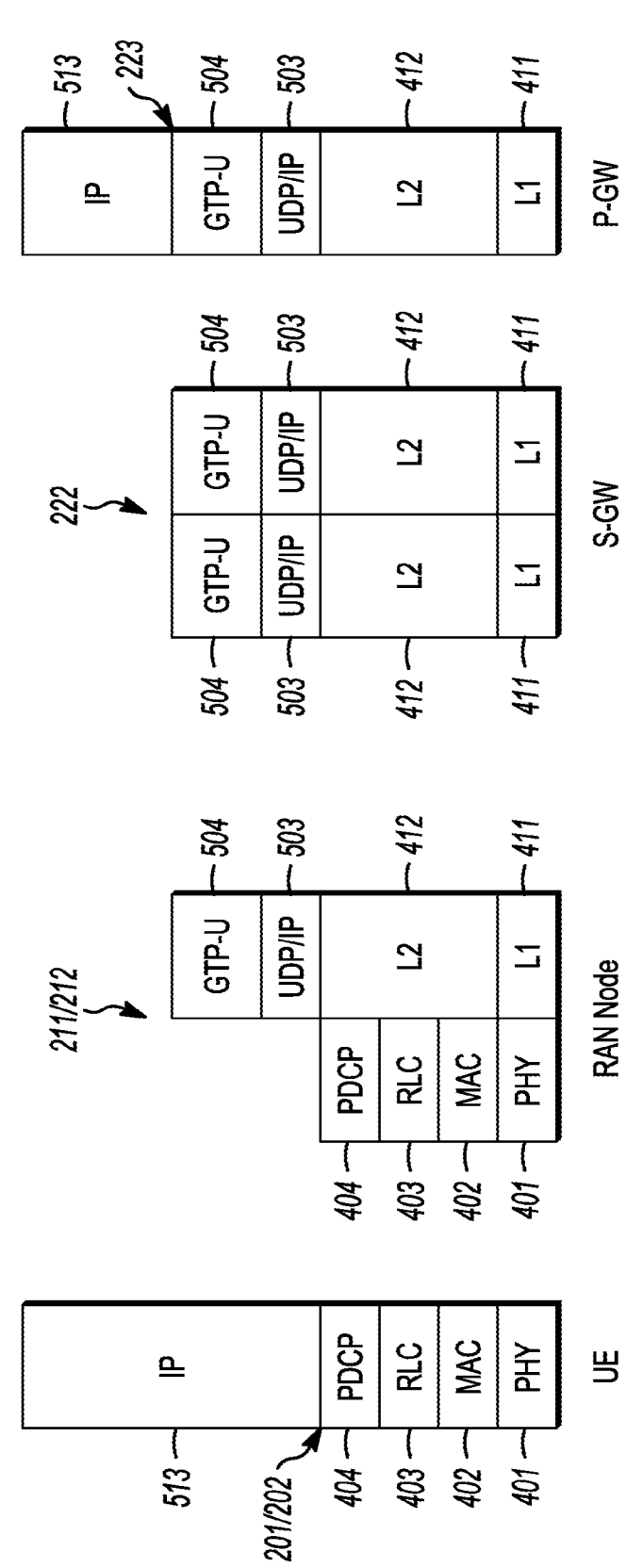
FIG. 5 is an illustration of a user plane protocol stack in accordance with some embodiments.

FIG. 5 is an illustration of a user plane protocol stack in accordance with some embodiments. In this embodiment, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
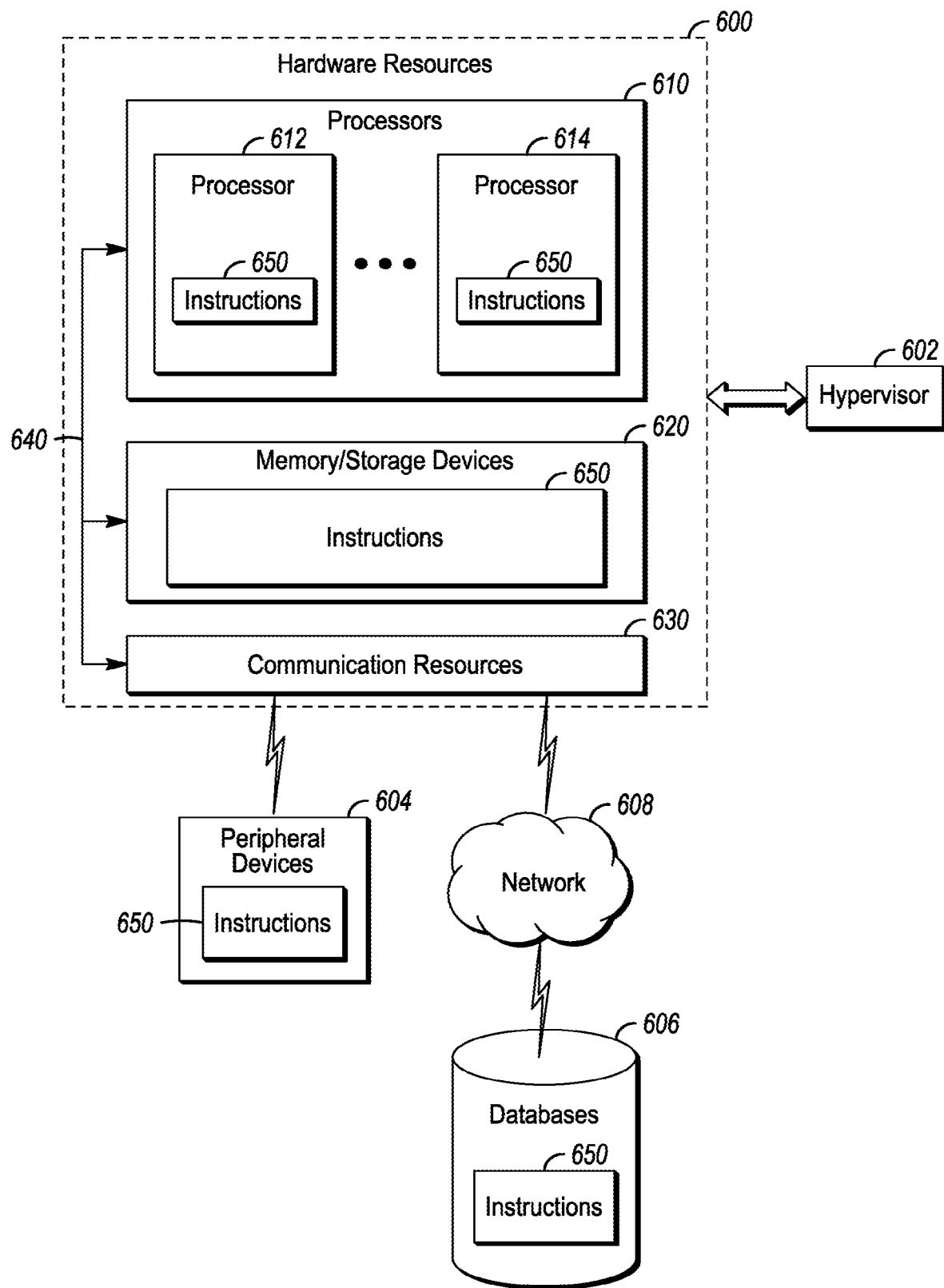
FIG. 6 is a block diagram illustrating components, according to some example embodiments.

FIG. 6 is a block diagram illustrating components, according to some example embodiments. The components of FIG. 6 are able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For embodiments where node virtualization (e.g., NFV) is utilized, a hypervisor 602 may be executed to provide an execution environment for one or more network slices/sub-slices to utilize the hardware resources 600.

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. In some embodiments, the instructions 650 may reside on a tangible, non-volatile communication device readable medium, which may include a single medium or multiple media. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

As described above, the use of narrowband IoT (NB-IoT) communications may be desirable in an increasing number of circumstances. The LTE system may optimize various parameters to enable communication with a massive number of such devices. The NB-IoT UEs may differ from typical UEs and have very low device complexity, be latency-tolerant, and use low throughput and very low power consumption. Designs of systems compatible with NB-IoT UEs can be based on an evolution of the 3GPP LTE-Advanced features like 3GPP Release 13 support of low complexity MTC devices (termed as Rel-13 LC UE or Category M1 devices) that to support a bandwidth of 1.4 MHz on the DL and UL at both RF and baseband irrespective of the system bandwidth. The 3GPP LTE NB-IoT specifications define a Radio Access Technology (RAT) for NB-IoT based on a non-backward-compatible variant of the E-UTRA standard specifically tailored towards improved indoor coverage, support for a massive number of low throughput devices, low delay sensitivity, ultra-low device complexity and cost, low device power consumption and (optimized) network architecture. Unlike LTE systems, in which communications may use channel bandwidths of 1.4 MHz to 20 MHz (or more), NB-IoT UEs may communicate using bandwidths of 180 kHz. Systems that are compatible with NB-IoT communications thus support only 180 kHz UE bandwidths for both DL and UL with NB-IoT UEs.

Because of the different characteristics of NB-IoT UEs, additional functionalities are being developed. One of these functionalities is positioning—the accurate determination of the location of a UE. Positioning of NB-IoT UEs may be used in many IoT applications. In one example, the knowledge of the location of NB-IoT UEs used as smart meters (indoor/outdoor) is useful for the network to accurately track the energy consumption in certain areas. In another example, the knowledge of the location of NB-IoT UEs used as smart lighting, where information of the location of the street lights, can be used by the network for maintenance/replacement of the street lights.

However, in Release 13 the support of determining positioning in NB-IoT UEs is limited. In some embodiments, Cell Identification (CID) methods may be used, as may other positioning techniques, assuming the Location Service (LCS) architecture and Location Positioning Protocols (LPP, LPPa) as specified in LTE. These other positioning techniques may include all RAT-independent methods. RAT-independent methods may avoid the use of network assistance such as Global Navigation Satellite System (GNSS), Barometric pressure, WLAN, Bluetooth, and Metropolitan Beacon System (MBS). The other positioning techniques may also include an E-CID method based on Timing Advance (TA) Type 2 (i.e., based on RX-TX time difference measurements made by eNB).

Techniques that employ RAT-measurements by the UE (such as Reference Signal Time Difference (RSTD) for Observed Time Difference of Arrival (OTDOA), and RSRP, RSRQ, UE RX-TX time difference measurement for E-CID) are not supported in Release 13. One reason for this is the limited NB-IoT UE resources. As above, a NB-IoT UE is characterized by limited processing capability, limited memory and only a single RF transceiver chain. As a result, in Release 14 solutions for the efficient support of OTDOA and E-CID in NB-IoT remain unresolved.

Embodiments herein may efficiently support positioning in NB-IoT for both idle mode (RRC_Idle) and connected mode (RRC_Connected). The NB-IoT UE may enter idle mode from the connected mode after an inactivity timer expires in the eNB. The inactivity timer is the time in which no traffic between the eNB and the NB-IoT UE has occurred. In idle mode, from an EPS Mobility Management (EMM) perspective, the NB-IoT UE may be in the EMM-Registered and EMM-Idle state in which the NB-IoT UE no longer has any connectivity to the EPC, and all context relating to the UE is removed from the E-UTRAN. However, the NB-IoT UE may continue to undertake functions in idle mode; the NB-IoT UE may monitor paging occasions and engage in cell reselection and Tracking Area Updates. The NB-IoT UE may use Discontinuous Reception (DRX) to reduce power consumption. When idle, the MME may maintain the NB-IoT UE context and maintain bearers established for the NB-IoT UE.

Specifically, when the inactivity timer expires, the eNB may send an S1 UE Context Release Request message to the MME. The MME may in response send a Release Access Bearers Request message to the S-GW to release the S1-U bearers associated with the EPS bearers of the NB-IoT UE.

The MME may subsequently transmit a UE Context Release Command to the eNB to release the corresponding S1-U context of the NB-IoT UE. The eNB may in response send an RRC Connection Release message to the NB-IoT UE to tear down all traffic and signaling bearers and remove the NB-IoT UE context. Afterwards, the eNB may indicate to the MME that the NB-IoT UE context has been released, at which point the S-AP signaling connection between the MME and the eNB for the UE may be released. While the NB-IoT UE is in idle mode, the MME may retain the NB-IoT UE context, including the S-GW S1-U configuration information.

Although various embodiments are described with focus on the OTDOA and E-CID positioning methods, the solutions can be extended to other positioning methods as well where measurements are to be performed and reported by the UE to the network. e.g. Assisted (A-GNSS), Barometric pressure, WLAN, Bluetooth, and MBS.

The various embodiments disclosed herein may permit a location server, such as an Enhanced Serving Mobile Location Center (E-SMLC) or Secure User Plane Location (SUPL) Location Platform (SUPL SLP), which may not know how to properly adapt the LPP message sizes for NB-IoT UEs, which characteristics to use for communications between the eNB and the NB-IoT UE. For example as described in more detail below, the location server may be provided with a message indicating the OTDOA assistance data and the values for transmission/retransmission and response timers. The location server may use the information to properly configure the positioning measurements for NB-IoT UEs, e.g. in terms of amount and interval of reporting and QoS requirements. In some circumstances, the provisioning of OTDOA assistance data via LPP-dedicated signaling only may lead to overload of the NB-IoT cell. This may consequently lead to the UE being in connected mode for a longer duration to receive the common OTDOA assistance data. The eNB may in addition be unaware of the LPP signaling and thus may be unable to properly support the NB-IoT UE to perform the requested positioning measurements while in connected mode, for example, by configuring DRX and measurement gaps. Moreover, positioning supported only in connected mode, may result in higher consumption of the already constrained resources in a NB-IoT UE.

To mitigate these issues, different embodiments are provided herein to support positioning in NB-IoT for both idle mode and connected mode. In some embodiments, positioning measurements may be able to be triggered in idle mode or connected mode, rather than connected mode alone. The ability of the network to trigger positioning measurements may be based on the knowledge stored in the location server (or eNB) that a location for a NB-IoT UE is to be determined. In this case, the location server may explicitly signal (via the eNB) to the NB-IoT UE via LPP messages to perform positioning measurements in either the idle or connected mode, rather than being limited to the connected mode only. The location server may signal the NB-IoT UE either as common information or alternatively as positioning method-specific information.

An LPP message may provide a complete set of information for an invocation or response pertaining to an LPP transaction. An example of the LPP message may be:

```
-- ASN1START
LPP-Message ::= SEQUENCE {
    transactionID         LPP-TransactionID    OPTIONAL,   -- Need ON
    endTransaction        BOOLEAN,
    sequenceNumber        SequenceNumber       OPTIONAL,   -- Need ON
    acknowledgement       Acknowledgement      OPTIONAL,   -- Need ON
    lpp-MessageBody       LPP-MessageBody      OPTIONAL    -- Need ON
}
SequenceNumber ::= INTEGER (0..255)
Acknowledgement ::= SEQUENCE {
    ackRequested      BOOLEAN,
    ackIndicator      SequenceNumber   OPTIONAL
}
-- ASN1STOP
``` where the acknowledgement field may be included in an LPP acknowledgement and in any LPP message requesting an acknowledgement when LPP operates over the control plane, the ackRequested field may indicate whether or not an LPP acknowledgement is requested, and the lpp-MessageBody may identify the type of an LPP message and contain all LPP information specifically associated with that type (and may be omitted when the LPP message is sent only to acknowledge a previously received message). An example of the LPP-MessageBody may be:

```
-- ASN1START
LPP-MessageBody ::= CHOICE {
    c1                          CHOICE {
        requestCapabilities         RequestCapabilities,
        provideCapabilities         ProvideCapabilities,
        requestAssistanceData       RequestAssistanceData,
        provideAssistanceData       ProvideAssistanceData,
        requestLocationInformation  RequestLocationInformation,
        provideLocationInformation  ProvideLocationInformation,
        abort                       Abort,
        error                       Error,
        spare7 NULL, spare6 NULL, spare5 NULL, spare4 NULL,
        spare3 NULL, spare2 NULL, spare1 NULL, spare0 NULL
    },
    messageClassExtension       SEQUENCE { }
}
-- ASN1STOP
```

The trigger may be signaled by the eNB as common information via a CommonIEsRequestLocationInformation information element (IE) within a RequestLocationInformation message. In other embodiments, the trigger may be transmitted in positioning method-specific information. In these embodiments, the location server may transmit via the eNB a OTDOA-RequestLocationInformation IE when OTDOA is to be used for position determination, and an ECID-RequestLocationInformation in case of when E-CID is to be used for position determination.

The signaling that indicates to the UE that positioning measurements are to be undertaken in either the idle or connected mode may be provided in an IE such as:

```
connectedModeMeasurements-r14    ENUMERATED {requested}
    OPTIONAL,
--Need ON
    idleModeMeasuremements-r14   ENUMERATED {requested}
    OPTIONAL
--Need ON
```

In other embodiments, the NB-IoT UE can decide to perform the requested measurements either in idle mode or connected mode. The NB-IoT UE may make the decision autonomously by applying a predetermined set of criteria. The NB-IoT UE may make the decision based on the positioning configuration that the NB-IoT UE receives from the location server via LPP. In particular, the autonomous decision may depend on the configuration as received in the CommonIEsRequestLocationInformation IE within the RequestLocationInformation message in terms of amount and interval of reporting and QoS requirements. For instance, if the configured amount and interval of reporting uses a longer measurement campaign from the NB-IoT UE, then the NB-IoT UE may decide to perform the measurements in idle mode. Similarly, the NB-IoT UE may decide to perform the measurements in idle mode if the NB-IoT UE receives relaxed QoS requirements, e.g. in terms of longer LPP response time (such as >128 seconds). The LPP response time is the maximum response time given as measured between receipt of the RequestLocationInformation IE and transmission of the corresponding ProvideLocationInformation IE.

For OTDOA, in some embodiments, the measurement may depend on the NB-IoT Positioning Reference Signal (NPRS) subframe configuration received for the OTDOA reference cell and neighbor cells. For NB-IoT communications, the density of the configured NPRS subframes in a cell can be very high. For instance, the value range of the consecutive NPRS subframe configuration may be {10, 20, 40, 80, 160, 320, 640, 1280} ms. Thus, high values for NPRS subframes are configured (e.g. 640 or 1280 ms) may impact normal uplink or downlink data transmission. In these cases, the NB-IoT UE may decide to measure the RSTD in idle mode.

For E-CID, in some embodiments, the measurement may depend on whether the eNB configures measurement gaps for measuring RSRP and/or RSRQ for inter-frequency neighbor cells in connected mode. For instance, if the eNB does not configure measurement gaps in connected mode, then the NB-IoT UE may decide to measure RSRP and/or RSRQ for inter-frequency neighbor cells in idle mode.

In some embodiments, OTDOA assistance data may be provided to the NB-IoT UE using dedicated and broadcast signaling. In this case, the OTDOA assistance data may be separated into UE-specific and common information. The UE-specific information may be sent to each NB-IoT UE via LPP-dedicated signaling, and the common information may be sent to all NB-IoT UEs in a cell via RRC broadcast signaling.

More specifically, OTDOA assistance data may take several kBytes sent for many neighbor cells (in legacy LTE this can be done for up to 72 neighbor cells). If the OTDOA assistance data is sent to many NB-IoT UEs via LPP-dedicated signaling only, the result may be to overload the capacity of a NB-IoT cell in addition to the NB-IoT UE being in connected mode for an extended time to receive the OTDOA assistance data. Therefore, to conserve resources, the OTDOA assistance data may be sent via RRC broadcast signaling. However, broadcast signaling may make sense only if the OTDOA assistance data contains common information applicable for all NB-IoT UEs in the cell. Therefore, the OTDOA assistance data may be separated into UE-specific and common information.

In some embodiments, the UE-specific information may contain the OTDOA assistance data for the reference cell. The UE-specific information may be sent to each NB-IoT UE via LPP dedicated signaling. The common information may contain the OTDOA assistance data for the neighbor cells and may be sent to all NB-IoT UEs in a cell via broadcast signaling.

In some embodiments, the NPRS information of the reference and neighbor cells containing NPRS subframe configuration, NPRS muting information etc. may be sent as common information to all NB-IoT UEs in a cell via broadcast signaling. The reference and neighbor cell information containing cell identity, carrier frequency etc. may be sent to each NB-IoT UE via LPP dedicated signaling.

In some embodiments, the NB-IoT may support three deployment scenarios (standalone, guard-band, in-band within LTE carrier). In this case, a mixture of cells deployed differently can be assumed within a geographical area. In this case, the OTDOA configuration of carriers which are common and static across all deployed cells may be sent as common information via broadcast signaling. Accordingly, the OTDOA configuration of carriers that are different and dynamic across all deployed cells may instead be sent as UE-specific information via LPP dedicated signaling.

In some embodiments, an indication of the NB-IoT categories (NB1, NB2) of the NB-IoT UE may be provided by the NB-IoT UE in the UE capability signaling transmitted from the UE to the eNB. Category NB1 may correspond to a maximum transport block size of 680 bits in downlink and 1000 bits in uplink per TT (i.e., 1 ms subframe). Category NB2 may correspond to a maximum transport block size of 1352 bits in downlink and 1800 bits in uplink per TTI.

With this indication, the location server may determine the resource constraints of the NB-IoT UE and take these constraints into account for adapting various communication characteristics. The communication characteristics may include, for example, the LPP message sizes, values for transmission/retransmission and/or response timers. The indication of the NB-IoT categories can be provided by the NB-IoT UE either as common information in a CommonIEsProvideCapabilities IE of a ProvideCapabilities message or as positioning method-specific information. In the latter case, the indication may be provided in an OTDOA-ProvideCapabilities IE for OTDOA and an ECID-ProvideCapabilities IE for E-CID.

Figure 7:
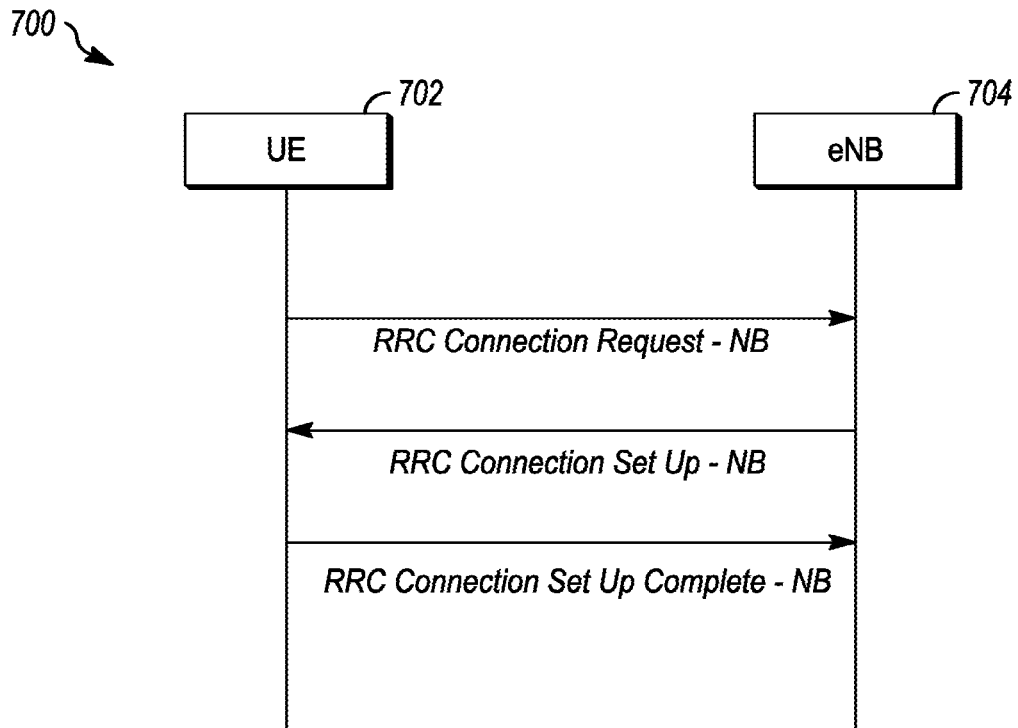
FIG. 7 illustrates connection establishment in accordance with some embodiments.

The positioning capabilities of the NB-IoT UE may be indicated in an RRC message, such as one of the RRC messages transmitted during connection establishment between the NB-IoT UE and the E-UTRAN. FIG. 7 illustrates connection establishment in accordance with some embodiments. The NB-IoT UE 702 and eNB 704 shown in FIG. 7 may be described in any one or more of FIGS. 1-6. The positioning capabilities of the NB-IoT UE 702 may be indicated by the NB-IoT UE 702 to the eNB 704 either in the RRC connection request (RRCConnectionRequest—NB) or the RRC connection setup complete (RRCConnectionSetupComplete—NB) message.

Figure 8:
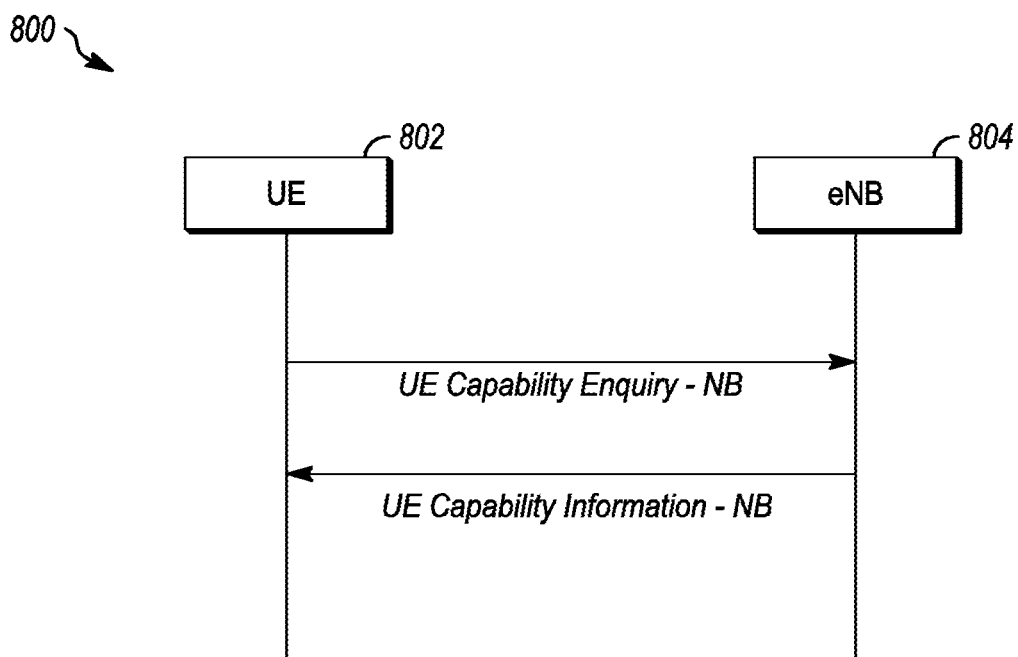
FIG. 8 illustrates communication of NB-IoT UE positioning capabilities in accordance with some embodiments.

FIG. 8 illustrates communication of NB-IoT UE positioning capabilities (LPP capabilities) in accordance with some embodiments. The NB-IoT UE 802 and eNB 804 shown in FIG. 8 may be described in any one or more of FIGS. 1-6. In FIG. 8, the positioning capabilities of the NB-IoT UE 802 may be indicated in a UE capability information message. In some embodiments, this message may be a new UE capability information (UECapabilityInformation—NB) message. The exchange of capabilities between the NB-IoT UE 802 and the location server may be initiated by a request from the location server or sent by the NB-IoT UE 802 as unsolicited information. If a request is used, the location server may send an LPP Request Capabilities message to the NB-IoT UE 802 with a request for capability information. The NB-IoT UE 802 may in response send an LPP Provide Capabilities message that indicates LPP-related capabilities to the location server. The capabilities may refer to particular position methods or may be common to multiple position methods.

Similarly, OTDOA or other location assistance data for the positioning method to be used may be sent from the location server to the NB-IoT UE 802 by request from the NB-IoT UE 802 or unsolicited to the NB-IoT UE 802. If by request, the NB-IoT UE 802 may indicate the particular assistance data to be sent by the location server, which may in response provide to the NB-IoT UE 802 at least the assistance data requested. The location server may provide additional assistance data to the NB-IoT UE 802 in one or more additional LPP messages.

In addition, the NB-IoT UE 802 may provide location information in response to a request or unsolicited, as above. The location information may include an actual position estimate and values used in computing position (e.g., radio measurements or positioning measurements). If by request, the location server may send a request for location information to the NB-IoT UE 802, and may indicate the type of location information to be sent as well as the associated QoS. In response, the NB-IoT UE 802 may transmit location information to the location server. The location information transferred may match the location information requested by the location server. The NB-IoT UE 802 may also transmit additional location information to the location server in one or more additional LPP messages. The request and response for assistance information (e.g., for a particular method) may occur after the request for location information (e.g., for the particular method) and before the response for location information. The capability information may be provided from the NB-IoT UE 802 before a request for location information by the location server.

In some embodiments, a new RRC message PositioningMeasurementIndication-NB may be introduced. Independent of whether an RRC message employed during setup or the new RRC message is used to provide the positioning capabilities of the NB-IoT UE, after the eNB receives and decodes the indication, the eNB may be able to determine the positioning capabilities of the NB-IoT UE. The eNB may be able to determine whether the NB-IoT UE is eligible to send a new RRC message PositioningMeasurementindication-NB during connected mode, whether to configure measurement gaps for E-CID inter-frequency RSRP/RSRQ measurements or DRX to the NB-IoT UE. The indication of the positioning capabilities of the NB-IoT UE in each of message may look as follows:

```
Positioning-Parameters-NB-r14 ::=           SEQUENCE {
    connectedModeMeasuremements-r14         ENUMERATED {supported}
    OPTIONAL
    idleModeMeasuremements-r14              ENUMERATED {supported}
    OPTIONAL
}
```

Figure 9:
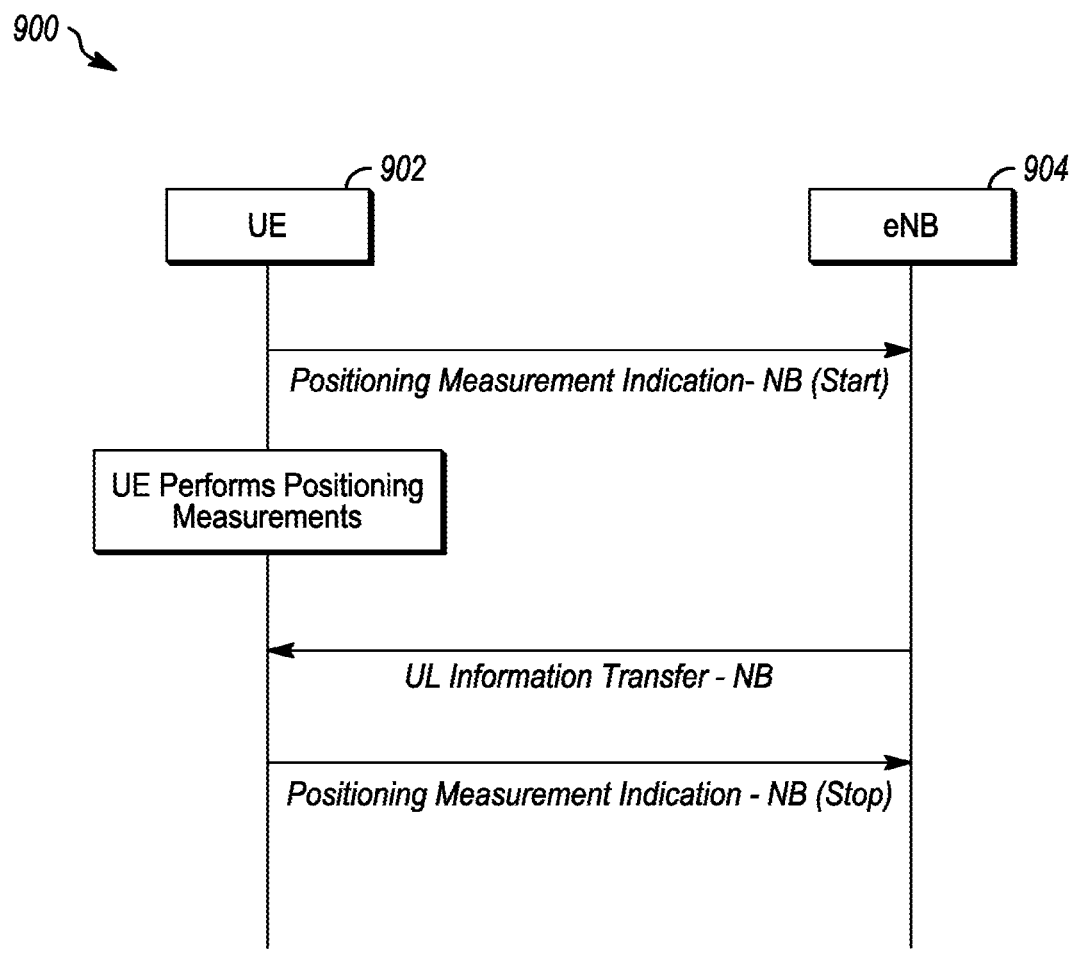
FIG. 9 illustrates NB-IoT UE positioning communications in accordance with some embodiments.

The PositioningMeasurementIndication-NB may indicate the start and stop of positioning measurements, and may request measurement gaps for E-CID inter-frequency RSRP/RSRQ measurements, and/or DRX if DRX is not configured or longer DRX. FIG. 9 illustrates NB-IoT UE positioning communications in accordance with some embodiments. The NB-IoT UE 902 and eNB 904 shown in FIG. 9 may be described in any one or more of FIGS. 1-6.

In FIG. 9, the NB-IoT UE 902 may transmit the RRC PositioningMeasurementIndication NB (Start) message to the eNB 904 and subsequently perform positioning measurements. After performing the measurements, the NB-IoT UE 902 may send the measured results to the location server via the eNB 904. The measured results may be embedded in a ULInformationTransfer-NB message. After transmitting the measured results (whether OTDOA or ECID) the NB-IoT UE 902 may transmit the RRC PositioningUeasurementIndication—NB (Stop) message to the eNB 904. The new PositioningMeasurementIndication-NB message may be given as:

```
-- ASN1START
PositioningMeasurementIndication-NB ::=             SEQUENCE {
    criticalExtensions                  CHOICE {
        c1                                          CHOICE {
            positioningMeasurementIndication-r14
        PositioningMeasurementIndication-NB-r14-IEs,
            spare3 NULL, spare2 NULL, spare1 NULL
        },
        criticalExtensionsFuture        SEQUENCE { }
    }
}
PositioningMeasurententIndication-NB-r14-IEs ::=    SEQUENCE {
    measurementIndication-r14   CHOICE {
        start                                       NULL,
        stop                                        NULL
    } OPTIONAL,
    measGapRequest-r14                  ENUMERATED {true }
OPTIONAL,
    drxConfigRequest-r14                ENUMERATED {true }
OPTIONAL,
    lateNonCriticalExtension            OCTET STRING
    OPTIONAL,
    nonCriticalExtension                SEQUENCE { }
    OPTIONAL
}
-- ASN1STOP
```

Figure 10:
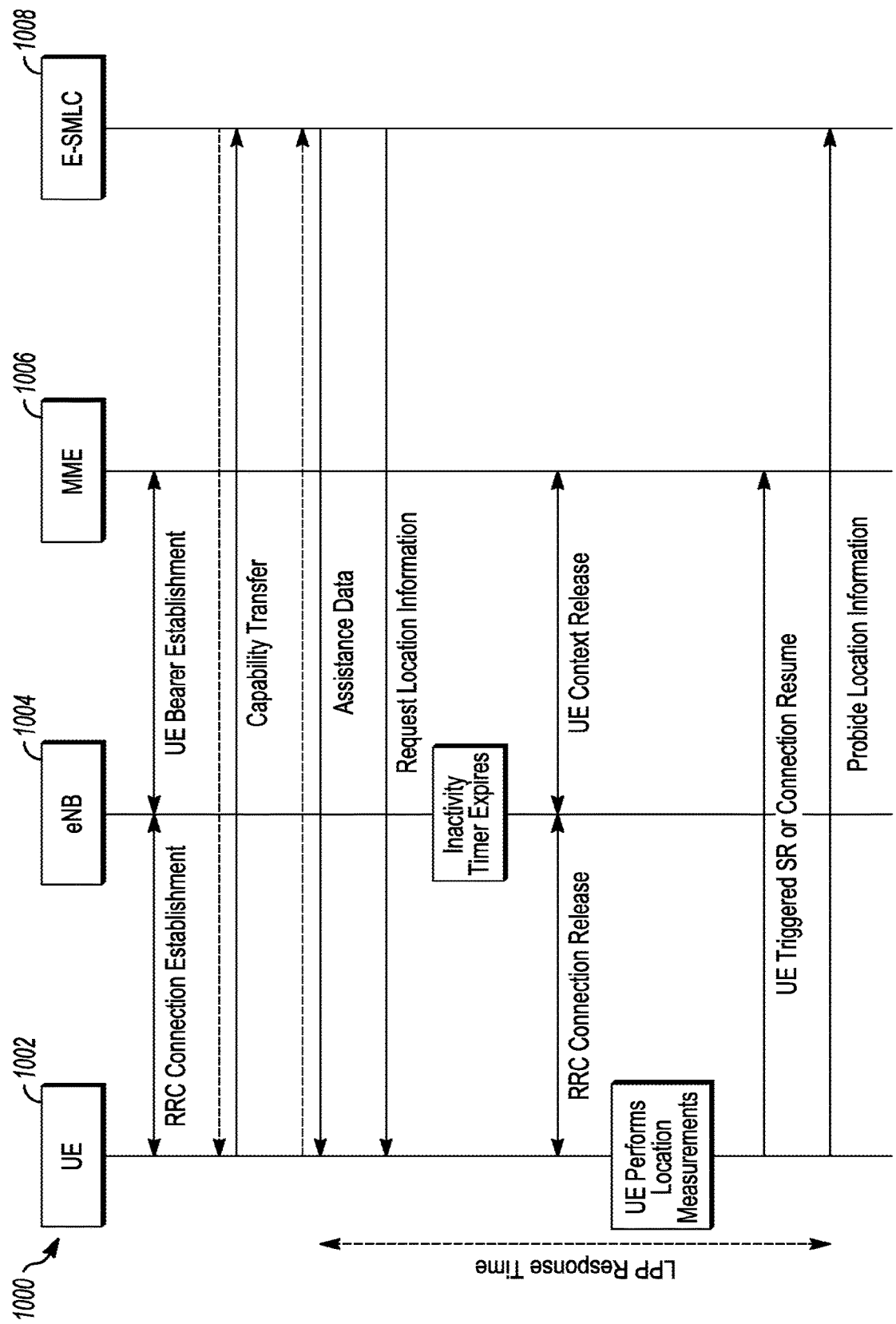
FIG. 10 illustrates NB-IoT UE positioning in idle state in accordance with some embodiments.

Combining the above, the NB-IoT UE can decide to perform the requested measurements in idle mode. NB-IoT UEs may perform measurements for some positioning methods only when in idle state. FIG. 10 illustrates NB-IoT UE positioning in idle state in accordance with some embodiments. The NB-IoT UE 1002, eNB 1004, MME 1006 and E-SMLC 1008 shown in FIG. 10 may be described in any one or more of FIGS. 1-6. Note as described herein, as elsewhere, the transmitting entity may encode the messages before transmission to the receiving entity, where the messages are decoded and then further processed. The encoding and decoding may be performed in local processing circuitry and transmitted and received via a local transceiver.

As above, the NB-IoT UE 1002 may initiate RRC connection with the E-UTRAN (eNB 1004) as described in relation to FIG. 7. This may involve (encoding and) transmission by the NB-IoT UE 1002 to the eNB 1004 of a RRC Connection Request message, transmission by the eNB 1004 to the NB-IoT UE 1002 of a RRC Connection Setup message in response and subsequent transmission by the NB-IoT UE 1002 to the eNB 1004 of a RRC Connection Setup Complete message. The connection may be an initial connection or reestablishment from idle mode. If initial establishment, the MME 1006 may set up bearers with the S-GW (not shown) and eNB 1004 for the NB-IoT UE 1002.

The NB-IoT UE 1002 may include in one of the RRC messages, the access type (NB-IoT) and/or coverage level of the NB-IoT UE 1002, for example, as given by common information such as the AccessTypes IE in which the access type may be represented by a bit string:

```
-- ASN1START
AccessTypes ::= SEQUENCE {
    accessTypes    BIT STRING {    eutra    (0),
                                    utra     (1),
                                    gsm      (2),
                                    nb-iot   (3) } (SIZE (1..8)),
    ...
}
-- ASN1STOP
```

This information may be provided to the E-SMLC 1008 from a LocationServiceRequest message received from the MME 1006. The E-SMLC 1008 may send a LPP Request-Capabilities message to the NB-IoT UE 1002 to obtain the NB-IoT UE 1002 positioning method capabilities from the NB-IoT UE 1002. Indication of the NB-IoT categories (NB1, NB2) of the NB-IoT UE in the capability signaling. With this indication the location server (E-SMLC) would know the resource constraints of the NB-IoT UE and would take them into account for adapting e.g. the LPP message sizes, values for transmission/retransmission and response timers The NB-IoT UE 1002 may send positioning method capabilities to the E-SMLC 1008 in a LPP Provide Capabilities message. The positioning method capabilities may be requested or sent unsolicited. The LPP ProvideCapabilities message may include a positioning configuration that indicates position methods for which the NB-IoT UE 1002 is to make measurements in idle state.

The E-SMLC 1008 may determine the assistance data used for the selected position method or methods. The E-SMLC 1008 may send the assistance data to the NB-IoT UE 1002 in one or more LPP Provide Assistance data messages. The assistance data may be requested or sent unsolicited. In some embodiments, the E-SMLC 1008 may request an acknowledgment for each LPP Provide Assistance data message.

If the NB-IoT UE 1002 capabilities received by the E-SMLC 1008 (e.g., access type NB-IoT) indicate that the positioning measurements are to occur during the idle state, the E-SMLC 1008 may determine additional response time is to be used by the NB-IoT UE 1002 to obtain the location measurements. The E-SMLC 1008 may send one or more LPP Request Location Information messages to the NB-IoT UE 1002 requesting positioning measurements or a location estimate. The LPP Request Location Information messages may include the response time. The LPP Request Location Information messages may include the response time, message size, QoS information and other information in a CommonIEsRequestLocationInformation IE given by:

```
-- ASN1START
CommonIEsRequestLocationInformation ::= SEQUENCE {
    locationInformationType    LocationInformationType,
    triggeredReporting         TriggeredReportingCriteria    OPTIONAL,    -- Cond ECID
    periodicalReporting        PeriodicalReportingCriteria   OPTIONAL,    -- Need ON
    additionalInformation      AdditionalInformation         OPTIONAL,    -- Need ON
    qos                        QoS                           OPTIONAL,    -- Need ON
    environment                Environment                   OPTIONAL,    -- Need ON
    locationCoordinateTypes    LocationCoordinateTypes       OPTIONAL,    -- Need ON
    velocityTypes              VelocityTypes                 OPTIONAL,    -- Need ON
    ...,
    [[
        messageSizeLimitNB-r14    MessageSizeLimitNB-r14     OPTIONAL     -- Need ON
    ]]
}
LocationInformationType ::= ENUMERATED {
    locationEstimateRequired,
    locationMeasurementsRequired,
    locationEstimatePreferred,
    locationMeasurementsPreferred,
    ...
}
PeriodicalReportingCriteria ::=     SEQUENCE {
    reportingAmount                    ENUMERATED {
                                           ra1, ra2, ra4, ra8, ra16, ra32,
                                           ra64, ra-Infinity
                                       } DEFAULT ra-Infinity,
```

```
        reportingInterval              ENUMERATED {
                                              noPeriodicalReporting, ri0-25,
                                              ri0-5, ri1, ri2, ri4, ri8, ri16,
ri32, ri64
                                       }
}
TriggeredReportingCriteria ::=         SEQUENCE {
    cellchange                             BOOLEAN,
    reportingDuration                      ReportingDuration,
    ...
}
ReportingDuration ::=                  INTEGER (0..255)
AdditionalInformation ::= ENUMERATED {
    onlyReturnInformationRequested,
    mayReturnAditionalInformation,
    ...
}
QoS ::= SEQUENCE {
    horizontalAccuracy       Horizontal Accuracy    OPTIONAL,        -- Need ON
    verticalCoordinateRequest BOOLEAN,
    verticalAccuracy         VerticalAccuracy       OPTIONAL,        -- Need ON
    responseTime             ResponseTime           OPTIONAL,        -- Need ON
    velocityRequest          BOOLEAN;
    ...,                     ZZZZZ  ZZZZZ  ZZZZZ   ZZZZZ  ZZZZZ   ZZZZZ  ZZZZZ  ZZZZZ  ZZZZZ
    [[ responseTimeNB-r14    ResponseTimeNB-r14     OPTIONAL         -- Need ON
    ]]
}
HorizontalAccuracy ::= SEQUENCE {
    accuracy     INTEGER(0..127),
    confidence   INTEGER(0..100),
    ...
}
VerticalAccuracy ::= SEQUENCE {
    accuracy     INTEGER (0..127),
    confidence   INTEGER(0..100),
    ...
}
ResponseTime ::= SEQUENCE {
    time                             Integer (1..128),
    ...
    [[ responseTimeEarlyFix-r12      INTEGER (1..128)      OPTIONAL          -
- Need-ON
    ]]
}
ResponseTimeNB-r14 :: = SEQUENCE {
    timeNB-r14                       INTEGER (1..512),
    responseTimeEarlyFixNB-r14       INTEGER (1..512)      OPTIONAL,         -
- Need ON
    ...
}
Environment ::= ENUMERATED {
    badArea,
    notBadArea,
    mixedArea,
    ...
}
MessageSizeLimitNB-r14 ::= SEQUENCE {
    measurementLimit-r14             INTEGER(1..512)       OPTIONAL,         -
- Need ON
    ...
}
-- ASN1STOP
```

As can be seen from the CommonIEsRequesLocationInformation IE, the responseTimeNB may be substantially longer than the responseTime. The responseTimeNB may indicate the maximum response time as measured between receipt by the NB-IoT UE 1002 of the RequestLocationInformation message and transmission of a ProvideLocationInformation message. The responseTimeNB may be given as an integer number of seconds between 1 and 512, rather than the non-NB-IoT responseTime, whose maximum is ¼ as long (128 seconds maximum).

The messageSizeLimitNB may provide an octet limit on the amount of location information the NB-IoT UE 1002 can return. The measurementLimit may indicate the maximum amount of location information the NB-IoT UE 1002 should return in response to the RequestLocationInformation message received from the location server (E-SMLC 1008). The limit may apply to the overall size of the LPP message at LPP level (LPP Provide Location Information), and may be specified in steps of 100 octets. The message size limit may be then given by the value provided in measurementLimit times 100 octets. Thus, in response to indication in the capability signaling that the UE is an NB-IoT UE, the E-SMLC 1008 may determine the resource constraints of the NB-IoT UE 1002 and may take the resource constraints into account for adapting the values for transmission, retransmission and response timers and the LPP message sizes.

For the E-CID positioning method, when NRSRP/NRSRQ measurements are requested, the NB-IoT UE 1002 may be requested to provide NRSRP/NRSRQ measurements for intra-frequency neighbour cells and for inter-frequency neighbour cells. The NB-IoT UE 1002 may use inter-frequency information in system information of the serving cell to decide on which inter-frequency cells to measure.

The LPP RequestLocationInformation message may carry a request for an acknowledgement from the NB-IoT UE 1002. In response, the NB-IoT UE 1002 may transmit an LPP acknowledgement for each received LPP Request Location Information message to the E-SMLC 1008. An example of the LPP RequestLocationInformation in the LPP message may be:

until the network releases or suspends the RRC connection. This may include both the MME 1006 indicating that the eNB 1004 is to release the NB-IoT UE bearers and the eNB 1004 sending an OTA RRCConnectionRelease message to the NB-IoT UE 1002 indicating that the NB-IoT UE 1002 is to move to idle mode. As above, the release or suspension may be based on the inactivity timer in the eNB 1004. At this point, the NB-IoT UE 1002 may receive an RRC connection release or suspend from the eNB 1004 due to the expiration of the inactivity timer.

When the NB-IoT UE 1002 has entered idle state, the NB-IoT UE 1002 may then perform the requested positioning measurements. Before the location measurements are to be sent to the E-SMLC 1008, the NB-IoT UE 1002 may instigate a NB-IoT UE-triggered service request or an RRC

```
-- ASN1START
RequestLocationInformation ::= SEQUENCE {
    criticalExtensions     CHOICE {
        c1                 CHOICE {
            requestLocationInformation-r9  RequestLocationInformation-r9-IEs,
            spare3 NULL, spare2 NULL, spare1 NULL
        },
        criticalExtensionsFuture    SEQUENCE { }
    }
}
RequestLocationInformation-r9-IEs ::= SEQUENCE {
    commonIEsRequestLocationInformation
                                          CommonIEsRequestLocationInformation
        OPTIONAL,  -- Need ON
    a-gnss-RequestLocationInformation     A-GNSS-RequestLocationInformation
        OPTIONAL,  -- Need ON
    otdoa-RequestLocationInformation      OTDOA-RequestLocationInformation
        OPTIONAL,  -- Need ON
    ecid-RequestLocationInformation       ECID-RequestLocationInformation
        OPTIONAL,  -- Need ON
    epdu-RequestLocationInformation       EPDU-Sequence
        OPTIONAL,  -- Need ON
    ...,
    [[
    sensor-RequestLocationInformation-r13
                                          Sensor-RequestLocationInformation-r13
        OPTIONAL,  -- Need ON
    tbs-RequestLocationInformation-r13    TBS-RequestLocationInformation-r13
        OPTIONAL,  -- Need ON
    wlan-RequestLocationInformation-r13   WLAN-RequestLocationInformation-r13
        OPTIONAL,  -- Need ON
    bt-RequestLocationInformation-r13     BT-RequestLocationInformation-r13
        OPTIONAL   -- Need ON
    ]]
}
-- ASN1STOP
```

The NB-IoT UE 1002 may, however, not perform the requested measurements immediately upon receipt of the LPP RequestLocationInformation message. Based on the positioning configuration, the NB-IoT UE 1002 can decide autonomously by applying the criteria in the messages from the E-SMLC 1008 to perform the requested measurements either in idle mode or connected mode. Thus, in some embodiments, NB-IoT UE 1002 may instead finish any other activities in progress (e.g., SMS or data transfer), and wait Connection Resume procedure to establish a signalling connection with the MME 1006 and enter RRC Connected Mode.

When the LPP response time expires or when location measurements are available before expiry, the NB-IoT UE 1002 may send one or more LPP ProvideLocationInformation messages containing the requested location measurements or location estimate to the E-SMLC 1006 via the eNB 1004. An example of the LPP ProvideLocationInformation message may be:

```
-- ASN1START
ProvideLocationInformation :: = SEQUENCE {
    criticalExtensions   CHOICE {
         c1                 CHOICE {
             provideLocationInformation-r9    ProvideLocationInformation-r9-IEs,
             spare3 NULL, spare2 NULL, spare1 NULL
         },
         criticalExtensionsFuture    SEQUENCE { }
    }
}
ProvideLocationInformation-r9-IEs ::= SEQUENCE {
    commonIEsProvideLocationInformation
                                         CommonIEsProvideLocationInformation
    OPTIONAL,
    a-gnss-ProvideLocationInformation    A-GNSS-ProvideLocationInformation
    OPTIONAL,
    otdoa-ProvideLocationInformation     OTDOA-ProvideLocationInformation
    OPTIONAL,
    ecid-ProvideLocationInformation      ECID-ProvideLocationInformation
    OPTIONAL,
    epdu-ProvideLocationInformation      EPDU-Sequence
    OPTIONAL,
    ...,
    [[
    sensor-ProvideLocationInformation-r13
                                         Sensor-ProvideLocationInformation-r13
    OPTIONAL,
    tbs-ProvideLocationInformation-r13   TBS-ProvideLocationInformation-r13
    OPTIONAL,
    wlan-ProvideLocationInformation-r13  WLAN-ProvideLocationInformation-r13
    OPTIONAL,
    bt-ProvideLocationInformation-r13    BT-ProvideLocationInformation-r13
    OPTIONAL
    ]]
}
-- ASN1STOP
```

EXAMPLES

Example 1 is an apparatus of user equipment (UE), the apparatus comprising: processing circuitry arranged to: decode a request for location information Long Term Evolution (LTE) Positioning Protocol (LPP) message from a location server, the request for location information LPP message comprising a request for positioning measurements and a narrowband (NB) response time to provide the positioning measurements; decode a Radio Resource Control (RRC) connection release message from an evolved NodeB (eNB) after reception of the request for location information LPP message; enter an idle state in response to reception of the RRC connection release message; after entry into the idle state, perform measurements indicated by the request for location information LPP message; and encode, for transmission to the location server within the NB response time to obtain the positioning measurements, at least one LPP Provide Location Information message containing the positioning measurements; and a memory configured to store the NB response time and the positioning measurements.

In Example 2, the subject matter of Example 1 includes, wherein: the NB response time is longer than a non-NB response time.

In Example 3, the subject matter of Examples 1-2 includes, wherein: the request for location information LPP message further comprises a NB message size limit that indicates a limit on an amount of location information the UE is to return in response to the request for location information LPP message.

In Example 4, the subject matter of Examples 1-3 includes, wherein the processing circuitry is further configured to: encode, for transmission to the location server, a capability message that indicates position capabilities of the UE to support different positioning methods and information common to a plurality of the position methods, the capability message received prior to reception of the request for location information LPP message, the request for location information LPP message dependent on the position capabilities in the capability message.

In Example 5, the subject matter of Example 4 includes, wherein: the information comprises an indication of a type of the UE, the type of the UE being NB.

In Example 6, the subject matter of Examples 1-5 includes, wherein the processing circuitry is further configured to: decode, from the location server, assistance data to perform the measurements, the assistance data specific to a particular positioning method indicated by the location server, the assistance data received prior to reception of the request for location information LPP message.

In Example 7, the subject matter of Example 6 includes, wherein: the particular positioning method is Observed Time Difference of Arrival (OTDOA).

In Example 8, the subject matter of Example 7 includes, wherein: the assistance data comprises NB reference cell information and NB neighbor cell information, and the NB reference cell information and NB neighbor cell information are contained in different information elements than reference cell information and neighbor cell information for non-NB UEs.

In Example 9, the subject matter of Examples 6-8 includes, wherein: the particular positioning method is Enhanced Cell-ID (E-CID), and the measurements comprise at least one of Reference Signal Received Power (RSRP) and Reference Signal Received Quality (RSRQ) for inter-frequency neighbor cells.

In Example 10, the subject matter of Examples 1-9 includes, wherein the processing circuitry is further configured to: resume a signalling connection before transmission of the positioning measurements.

In Example 11, the subject matter of Examples 1-10 includes, wherein: the processing circuitry comprises a baseband processor configured to encode transmissions to, and decode transmissions from, the eNB.

Example 12 is an apparatus of a location server, the apparatus comprising: processing circuitry arranged to: decode a capability message from a narrowband (NB) user equipment (UE), the capability message comprising position capabilities of the NB UE to support different positioning methods; encode, for transmission to the NB UE, a request for location information Long Term Evolution (LTE) Positioning Protocol (LPP) message, the request for location information LPP message comprising a request for positioning measurements and a NB response time to provide the positioning measurements dependent on the position capabilities received in the capability message, wherein the NB response time is longer than a response time for a non-NB UE; decode, from the NB UE, at least one LPP Provide Location Information message containing the positioning measurements; and determine a location of the NB UE based on the positioning measurements; a memory configured to store the positioning measurements.

In Example 13, the subject matter of Example 12 includes, wherein: the request for location information LPP message further comprises a NB message size limit that indicates a limit on an amount of location information the NB UE is to return in response to the request for location information LPP message.

In Example 14, the subject matter of Examples 12-13 includes, wherein: the capability message further comprises information common to a plurality of the position methods, the information comprising an indication of a type of the NB UE, the type of the NB UE being NB.

In Example 15, the subject matter of Example 14 includes, wherein the processing circuitry is further configured to: generate the request for location information LPP message dependent on the indication of the type of the NB UE.

In Example 16, the subject matter of Examples 12-15 includes, wherein the processing circuitry is further configured to: encode, for transmission to the NB UE, assistance data to perform the measurements, the assistance data specific to a particular positioning method indicated by the location server, the assistance data transmitted prior to transmission of the request for location information LPP message.

In Example 17, the subject matter of Example 16 includes, wherein: the particular positioning method is Observed Time Difference of Arrival (OTDOA), and the assistance data comprises NB reference cell information and NB neighbor cell information, and the NB reference cell information and NB neighbor cell information are contained in different information elements than reference cell information and neighbor cell information for non-NB UEs.

In Example 18, the subject matter of Examples 16-17 includes, wherein: the particular positioning method is Enhanced Cell-ID (E-CID), and the measurements comprise at least one of Reference Signal Received Power (RSRP) and Reference Signal Received Quality (RSRQ) for inter-frequency neighbor cells.

In Example 19, the subject matter of Examples 12-18 includes, wherein: the location server comprises an Enhanced Serving Mobile Location Center (E-SMLC).

Example 20 is a non-transitory computer-readable storage medium that stores instructions for execution by one or more processors of a user equipment (UE), the one or more processors to configure the UE to, when the instructions are executed: transmit to a location server, a capability message that indicates position capabilities of the UE to support different positioning methods and common information related to a plurality of the position methods, wherein the information comprises an indication of a type of the UE, the type being narrowband (NB); receive a request for location information Long Term Evolution (LTE) Positioning Protocol (LPP) message from a location server after transmission of the capability message, the request for location information LPP message comprising a request for positioning measurements and a NB response time to provide the positioning measurements, wherein the NB response time is longer than 128 seconds; receive a Radio Resource Control (RRC) connection release message from an evolved NodeB (eNB) after reception of the request for location information LPP message; enter an idle state in response to reception of the RRC connection release message: after entry into the idle state, perform measurements indicated by the request for location information LPP message; and transmit, to the location server at expiry of or before the NB response time, at least one LPP Provide Location Information message containing the positioning measurements.

In Example 21, the subject matter of Example 20 includes, wherein: the request for location information LPP message further comprises a NB message size limit that indicates a limit on an amount of location information the NB UE is to return in response to the request for location information LPP message.

In Example 22, the subject matter of Examples 20-21 includes, wherein: the instructions further configure the one or more processors to configure the UE to receive, from the location server, assistance data to perform the measurements, the assistance data specific to a particular positioning method indicated by the location server, the assistance data received prior to reception of the request for location information LPP message, and when the particular positioning method is Observed Time Difference of Arrival (OTDOA), the assistance data comprises NB reference cell information and NB neighbor cell information, and the NB reference cell information and NB neighbor cell information are contained in different information elements than reference cell information and neighbor cell information for non-NB UEs.

Example 23 is a non-transitory computer-readable storage medium that stores instructions for execution by one or more processors of a location server, the one or more processors to configure the location server to, when the instructions are executed: receive a capability message from a narrowband (NB) user equipment (UE), the capability message comprising position capabilities of the NB UE to support different positioning methods; transmit, to the NB UE, a request for location information Long Term Evolution (LTE) Positioning Protocol (LPP) message, the request for location information LPP message comprising a request for positioning measurements and a NB response time to provide the positioning measurements dependent on the position capabilities received in the capability message, wherein the NB response time is longer than a response time for a non-NB UE; receive, from the NB UE, at least one LPP Provide Location Information message containing the positioning measurements; and determine a location of the NB UE based on the positioning measurements.

In Example 24, the subject matter of Example 23 includes, wherein: the request for location information LPP message further comprises a NB message size limit that indicates a limit on an amount of location information the NB UE is to return in response to the request for location information LPP message.

In Example 25, the subject matter of Examples 23-24 includes, wherein: the capability message further comprises common information of a plurality of the position methods, the information comprising an indication of a type of the NB UE, the type of the NB UE being NB.

In Example 26, the subject matter of Example 25 includes, wherein the instructions, when executed, further configure the location server to: generate the request for location information LPP message dependent on the indication of the type of the NB UE.

In Example 27, the subject matter of Examples 23-26 includes, wherein the instructions, when executed, further configure the location server to: transmit, to the NB UE, assistance data to perform the measurements, the assistance data specific to a particular positioning method indicated by the location server, the assistance data transmitted prior to transmission of the request for location information LPP message.

In Example 28, the subject matter of Example 27 includes, wherein: the particular positioning method is Observed Time Difference of Arrival (OTDOA), and the assistance data comprises NB reference cell information and NB neighbor cell information, and the NB reference cell information and NB neighbor cell information are contained in different information elements than reference cell information and neighbor cell information for non-NB UEs.

In Example 29, the subject matter of Examples 27-28 includes, wherein: the particular positioning method is Enhanced Cell-ID (E-CID), and the measurements comprise at least one of Reference Signal Received Power (RSRP) and Reference Signal Received Quality (RSRQ) for inter-frequency neighbor cells.

Example 30 is at least one machine-readable medium including instructions that, when executed by processing circuitry, cause the processing circuitry to perform operations to implement of any of Examples 1-29.

Example 31 is an apparatus comprising means to implement of any of Examples 1-29.

Example 32 is a system to implement of any of Examples 1-29.

Example 33 is a method to implement of any of Examples 1-29.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a memory; and
a processor in communication with the memory and configured to cause a user equipment (UE) to:
decode a Long Term Evolution (LTE) Positioning Protocol (LPP) Request for Location Information message from a location server, wherein the LPP Request for Location Information message comprises a request for positioning measurements and a narrowband (NB) response time to provide the positioning measurements;
enter an idle state;
after entry into the idle state, perform measurements indicated by the LPP Request for Location Information message; and
encode, for transmission to the location server, at least one LPP Provide Location Information message containing the positioning measurements, wherein the NB response time is a maximum time to provide the positioning measurements as measured between receipt of the LPP Request for Location Information message and the transmission to the location server of the at least one LPP Provide Location Information message.

2. The apparatus of claim 1, wherein the NB response time is greater than 128 seconds.

3. The apparatus of claim 1, wherein the LPP Request for Location Information message further comprises a NB message size limit that indicates a limit on an amount of location information the UE is to return in response to the LPP Request for Location Information message.

4. The apparatus of claim 1, wherein the processor is further configured to cause the UE to:
encode, for transmission to the location server, a capability message that indicates position capabilities of the UE to support different positioning methods and information common to a plurality of the position methods, the capability message transmitted prior to reception of the LPP Request for Location Information message, wherein the LPP Request for Location Information message is dependent on the position capabilities in the capability message.

5. The apparatus of claim 4, wherein the information comprises an indication of a type of the UE, the type of the UE being NB.

6. The apparatus of claim 1, wherein the processor is further configured to cause the UE to:
decode, from the location server, assistance data to perform the measurements, the assistance data specific to a particular positioning method indicated by the location server, the assistance data received prior to reception of the LPP Request for Location Information message.

7. The apparatus of claim 6,
wherein the particular positioning method is Enhanced Cell-ID (E-CID), and
wherein the measurements comprise at least one of Reference Signal Received Power (RSRP) and Reference Signal Received Quality (RSRQ) for inter-frequency neighbor cells.

8. The apparatus of claim 6,
wherein the particular positioning method is Observed Time Difference of Arrival (OTDOA).

9. The apparatus of claim 8,
wherein the assistance data comprises NB reference cell information and NB neighbor cell information, and the NB reference cell information and NB neighbor cell information are contained in different information elements than reference cell information and neighbor cell information for non-NB UEs.

10. The apparatus of claim 1,
wherein the processor is further configured to cause the UE to:
resume a signaling connection before transmission of the positioning measurements.

11. The apparatus of claim 1,
wherein the processor comprises a baseband processor configured to encode transmissions to, and decode transmissions from, the location server.

12. A non-transitory computer-readable storage medium that stores instructions for execution by one or more processors of a user equipment (UE), the one or more processors to configure the UE to, when the instructions are executed:
decode a Long Term Evolution (LTE) Positioning Protocol (LPP) Request for Location Information message, RequestLocationInformation, from a location server, wherein the LPP Request for Location Information message comprises a request for positioning measurements and a narrowband (NB) response time to provide the positioning measurements;
enter an idle state;
after entry into the idle state, perform measurements indicated by the LPP Request for Location Information message;
encode, for transmission to the location server, at least one LPP Provide Location Information message, ProvideLocationInformation, containing the positioning measurements, wherein the NB response time indicates a maximum response time to provide the positioning measurements as measured between receipt of the RequestLocationInformation and transmission of the ProvideLocationInformation; and
a memory configured to store the NB response time.

13. The non-transitory computer-readable storage medium of claim 12,
wherein the NB response time is greater than 128 seconds.

14. A method performed by a user equipment (UE), the method comprising:
decoding a Long Term Evolution (LTE) Positioning Protocol (LPP) Request for Location Information message, from a location server, the LPP Request for Location Information message comprising a request for positioning measurements and a narrowband (NB) response time to provide the positioning measurements;
entering an idle state;
after entering into the idle state, performing measurements indicated by the LPP Request for Location Information message; and
encoding, for transmission to the location server within or at the NB response time to obtain the positioning measurements, at least one LPP Provide Location Information message containing the positioning measurements; and
storing the NB response time.

15. The method of claim 14,
wherein the NB response time is greater than 128 seconds.

16. The method of claim 14,
wherein the NB response time is longer than a non-NB response time.

17. The method of claim 14,
wherein the LPP Request for Location Information message further comprises a NB message size limit that indicates a limit on an amount of location information the UE is to return in response to the LPP Request for Location Information message.

18. The method of claim 14, the method further comprising:
encoding, for transmission to the location server, a capability message that indicates position capabilities of the UE to support different positioning methods and information common to a plurality of the position methods, wherein the capability message is transmitted prior to reception of the LPP Request for Location Information message, and wherein the LPP Request for Location Information message is dependent on the position capabilities in the capability message.

19. The method of claim 18,
wherein the information comprises an indication of a type of the UE, the type of the UE being NB.

20. The method of claim 14, the method further comprising:
decoding, from the location server, assistance data to perform the measurements, wherein the assistance data is specific to a particular positioning method indicated by the location server, and wherein the assistance data is received prior to reception of the LPP Request for Location Information message.

* * * * *